(12) United States Patent
Yang et al.

(10) Patent No.: US 8,519,647 B2
(45) Date of Patent: Aug. 27, 2013

(54) DIRECT CURRENT MOTOR

(75) Inventors: Huizhong Yang, Hang Zhou (CN); Wei Bao, Hang Zhou (CN)

(73) Assignee: T-Max (Hang Zhou) Industrial Co., Ltd., Hangzhou (CN)

( * ) Notice: Subject to any disclaimer, the term of this patent is extended or adjusted under 35 U.S.C. 154(b) by 415 days.

(21) Appl. No.: 12/831,707

(22) Filed: Jul. 7, 2010

(65) Prior Publication Data

US 2011/0068720 A1    Mar. 24, 2011

(30) Foreign Application Priority Data

Sep. 23, 2009 (CN) .......................... 2009 1 0174206

(51) Int. Cl.
  *H02P 7/06* (2006.01)
  *H02P 7/00* (2006.01)

(52) U.S. Cl.
  USPC .......... 318/293; 318/280; 318/291; 310/68 R; 310/239

(58) Field of Classification Search
  USPC ................. 310/50, 68 R, 238–239; 318/280, 318/287, 288, 291, 292, 293
  See application file for complete search history.

(56) References Cited

U.S. PATENT DOCUMENTS

| | | | | | |
|---|---|---|---|---|---|
| 3,209,228 | A | * | 9/1965 | Gawron ........................ | 388/830 |
| 3,584,248 | A | * | 6/1971 | Higashino et al. .......... | 310/68 R |
| 3,924,147 | A | * | 12/1975 | Tarnow et al. .............. | 310/68 R |
| 4,092,577 | A | * | 5/1978 | Markham ...................... | 318/370 |
| 4,204,580 | A | * | 5/1980 | Nalley ............................. | 173/48 |
| 4,275,341 | A | * | 6/1981 | Huber et al. .................. | 318/376 |
| 4,348,603 | A | * | 9/1982 | Huber ............................. | 310/50 |
| 4,370,579 | A | * | 1/1983 | Kobayashi et al. ............. | 310/50 |
| 4,459,522 | A | * | 7/1984 | Huber ............................ | 318/293 |
| 4,523,115 | A | * | 6/1985 | Cuneo ............................ | 310/50 |
| 4,523,116 | A | * | 6/1985 | Dibbern et al. ................ | 310/71 |
| 4,593,220 | A | * | 6/1986 | Cousins et al. ............... | 310/239 |
| 4,942,346 | A | * | 7/1990 | Ardit et al. .................... | 318/280 |
| 5,008,574 | A | * | 4/1991 | Kitahata ..................... | 310/68 D |
| 5,672,922 | A | * | 9/1997 | Raichle et al. .............. | 310/68 A |
| 7,109,628 | B2 | * | 9/2006 | Yamamoto et al. ........... | 310/239 |
| 7,683,557 | B2 | * | 3/2010 | Lin ................................ | 318/291 |
| 2009/0322166 | A1 | * | 12/2009 | Satterfield et al. ............. | 310/50 |

\* cited by examiner

*Primary Examiner* — Burton Mullins

(57) ABSTRACT

A DC motor including a stator which includes a shell, a main magnetic pole and an exciting coil; a rotator disposed inside the stator; a brush holder disposed at an end of the shell; first and second carbon brushes disposed on the brush holder and contacted with the rotator respectively; a current direction controller disposed on the brush holder and connected with the first and second carbon brushes and first and second ends of the exciting coil respectively so as to control a direction of a current supplied to the exciting coil; and a cover disposed at the end of the shell so as to enclose the brush holder. The motor according to the present invention is compact in structure, small in volume, and occupies a small mounting space, and the work load of sealing and insulating is reduced, thus reducing the cost and improving the manufacture efficiency.

2 Claims, 7 Drawing Sheets

DIRECT CURRENT MOTOR

BACKGROUND OF THE INVENTION

1. Field of the Invention

The present invention relates to a motor, more particularly, to a series-excited direct current (DC) motor.

2. Description of the Related Art

For a DC motor capable of rotating in forward and inverse directions, the rotating direction is changed by changing a direction of the current supplied to the exciting coil. Conventionally, the controller capable of changing the direction of the current supplied to the exciting coil is disposed outside the motor, for example, mounted on the outer surface of the motor shell, and usually comprises four contactors, so that the controller has a plurality of wires and connection points.

Therefore, the motors of the type commonly known in the related art have a large volume, are not compact in structure, and occupy a large mounting space. Moreover, the controller needs to be enclosed, and the wires and connection points thereof need to be sealed and insulated respectively. These requirements increase the cost and reduces the operating efficiency of the motors.

Additionally, due to the large number of the wires and connection points, the work load of sealing and insulating the motor is large, the operation is complex, and the power consumption is increased. Further, because the controller is disposed outside the motor, the current direction controller and wires and connection points thereof tend to be damaged, thus causing higher maintenance cost.

SUMMARY OF THE INVENTION

The present invention overcomes at least one of the problems existing in the prior art. Accordingly, a DC motor is provided, in which a current direction controller is disposed inside the motor, so that wires and connection points may be decreased, the power consumption may be reduced, the operating efficiency may be improved, the current direction controller and wires and connection points thereof are not easy to damage, the work load of sealing and insulating may be reduced, and the structure of the motor may be compact.

The DC motor according to an embodiment of the present invention includes a stator including a shell, a main magnetic pole and an exciting coil. A rotator is disposed inside the stator. A brush holder is disposed at an end of the shell. First and second carbon brushes are disposed on the brush holder and in contact with the rotator respectively. A current direction controller is disposed on the brush holder and connected with the first and second carbon brushes and first and second ends of the exciting coil respectively so as to control a direction of a current supplied to the exciting coil. A cover is disposed at the end of the shell so as to enclose the brush holder.

The motor according to the embodiment of the present invention is compact in structure and small in volume, occupies a small mounting space, and the work load of sealing and insulating is reduced, so that the cost is reduced, and the manufacture efficiency is improved.

The above summary of the present invention is not intended to describe each disclosed embodiment or every implementation of the present invention. The Figures and the detailed description which follow more particularly exemplify illustrative embodiments.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION OF EMBODIMENTS OF THE INVENTION

Figure 1:
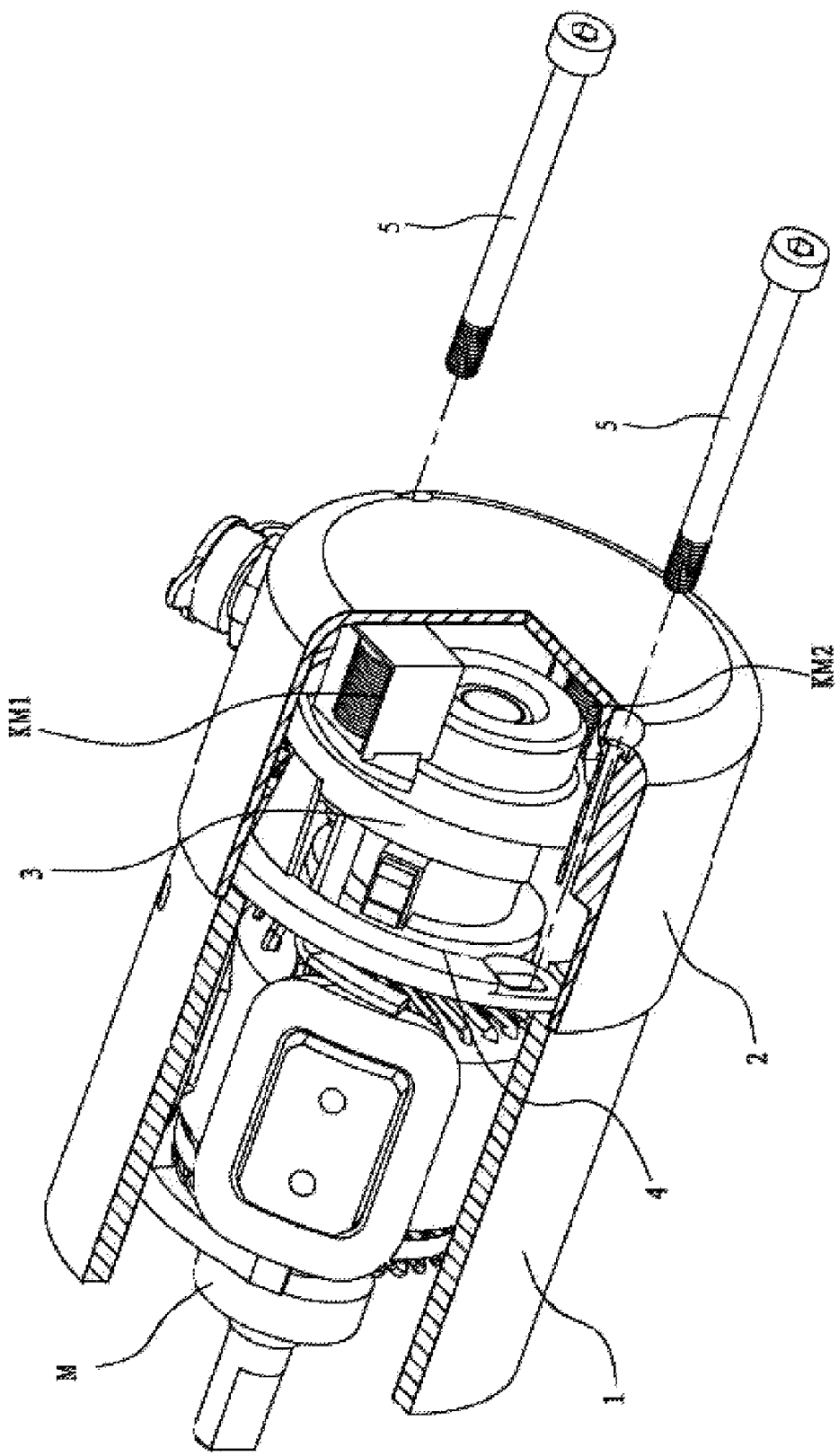
FIG. 1 is a partially sectioned perspective view of the DC motor according to one embodiment of the present invention.

Reference will be made in detail to embodiments of the present invention. The embodiments described herein with reference to drawings are explanatory, illustrative, and used to generally understand the present invention. The embodiments shall not be construed to limit the present invention. The DC motor according to one embodiment of the present invention will be described below in detail referring to the drawings. The same or similar elements and the elements having same or similar functions are denoted by like reference numerals throughout the descriptions.

Figure 2:
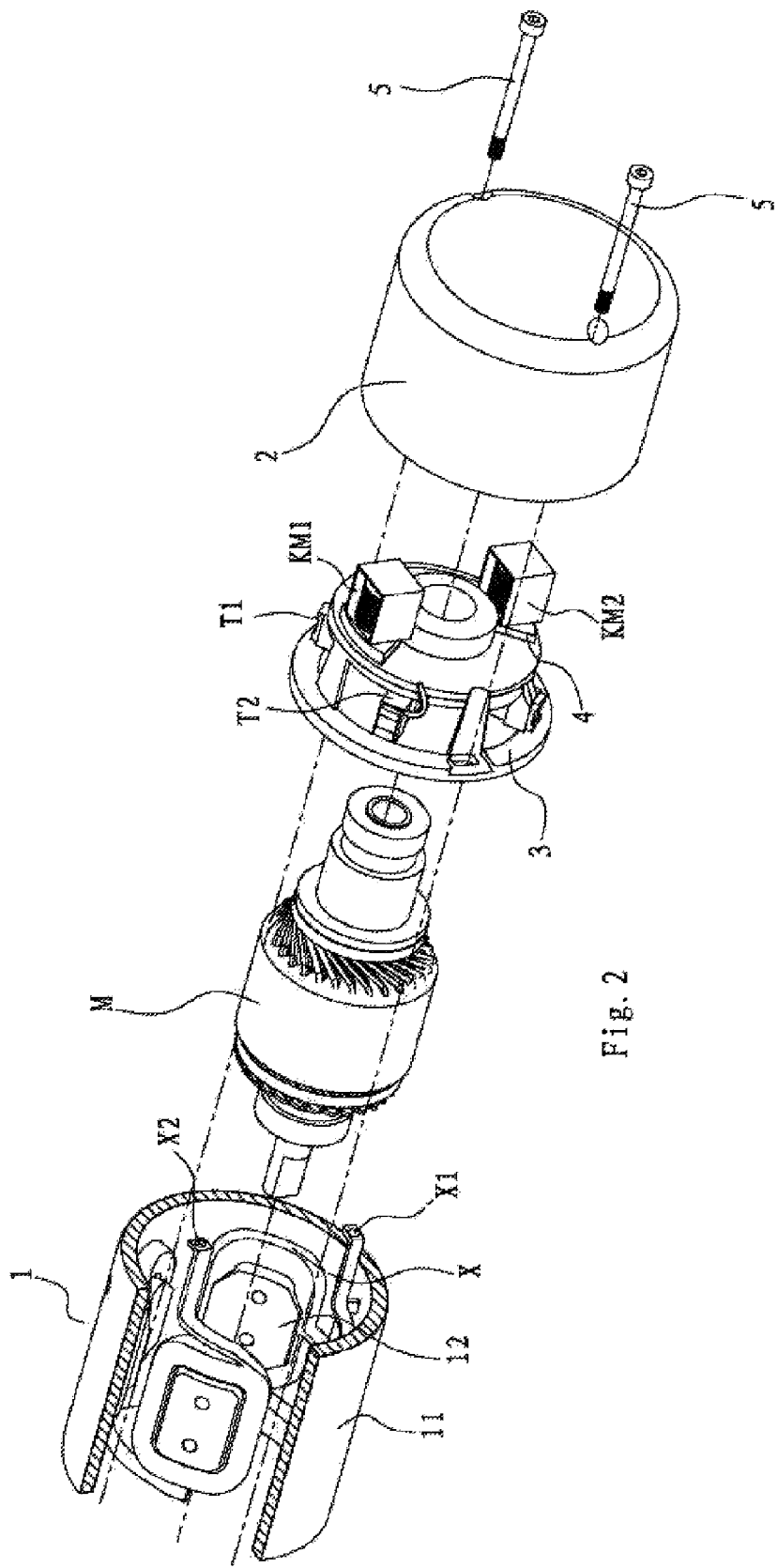
FIG. 2 is a exploded view of the DC motor according to one embodiment of the present invention.

As shown in FIGS. 1 and 2, the DC motor according to one embodiment of the present invention includes a stator 1, a rotator M, a brush holder 3, first and second carbon brushes T1, T2, a current direction controller 4, and a cover 2. Each of these components will be described in greater detail below.

The stator 1 includes a shell 11, and a main magnetic pole 12 and an exciting coil X disposed in the shell 11. The rotator M is disposed in the stator 1 so as to rotate under the action of the magnetic field in the shell 11. The brush holder 3 is mounted at an end of the shell 1 (for example, the right end of the shell 1 as illustrated in FIGS. 1 and 2). The first and second carbon brushes T1, T2 are mounted on the brush holder 3 and are in contact with the rotator M respectively. For example, the first and second carbon brushes T1, T2 are in sliding contact with the commutator of the rotator M. The current direction controller 4 is disposed on the brush holder 3 and connected with the first and second carbon brushes T1, T2 and first and second ends X1, X2 of the exciting coil X respectively so as to control or change a direction of a current supplied to the exciting coil X. The cover 2 is mounted onto an end of the shell 11 so as to seal the brush holder 3. For example, the cover 2 and the brush holder 3 may be mounted at the end of the shell 11 via a bolt 5. Therefore, as shown in FIG. 1, in an assembled state, the brush holder 3 and the current direction controller 4 mounted thereon are mounted at an end of the shell 11 and enclosed by the cover 2. As a result, the motor may have a compact structure, and occupy a small mounting space. Moreover, because the current direction controller 4 is disposed inside the cover 2, the current direction controller 4 and the wires and connection points thereof may not need to be sealed and insulated from outside, so that the cost is reduced, the safety and the manufacture efficiency are improved.

In some embodiments of the present invention, the DC motor may be a series-excited DC motor. More particularly, as shown in FIGS. 3-7, the current direction controller 4 comprises first and second contactors A1, A2. The first contactor A1 has a pair of normally open contacts K11, K12, a pair of normally closed contacts B11, B12, and a contactor coil KM1. The second contactor A2 has a pair of normally open contacts K21, K22, a pair of normally closed contacts B21, B22, and a contactor coil KM2.

Figure 6:
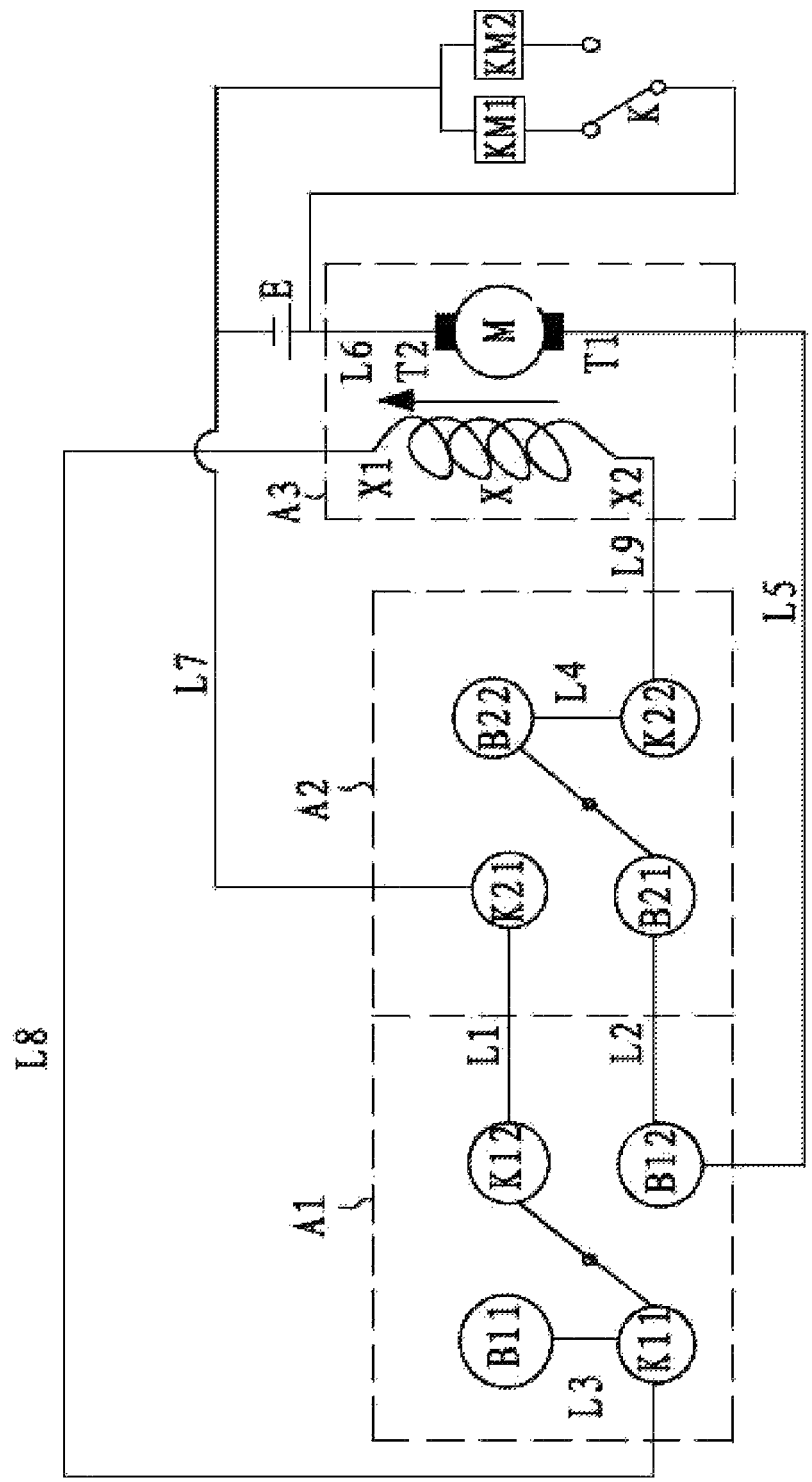
FIG. 6 is a principle diagram of the current direction controller according to one embodiment of the present invention, in which the current direction controller is in an energized state and the motor rotates in a first direction.
Figure 7:
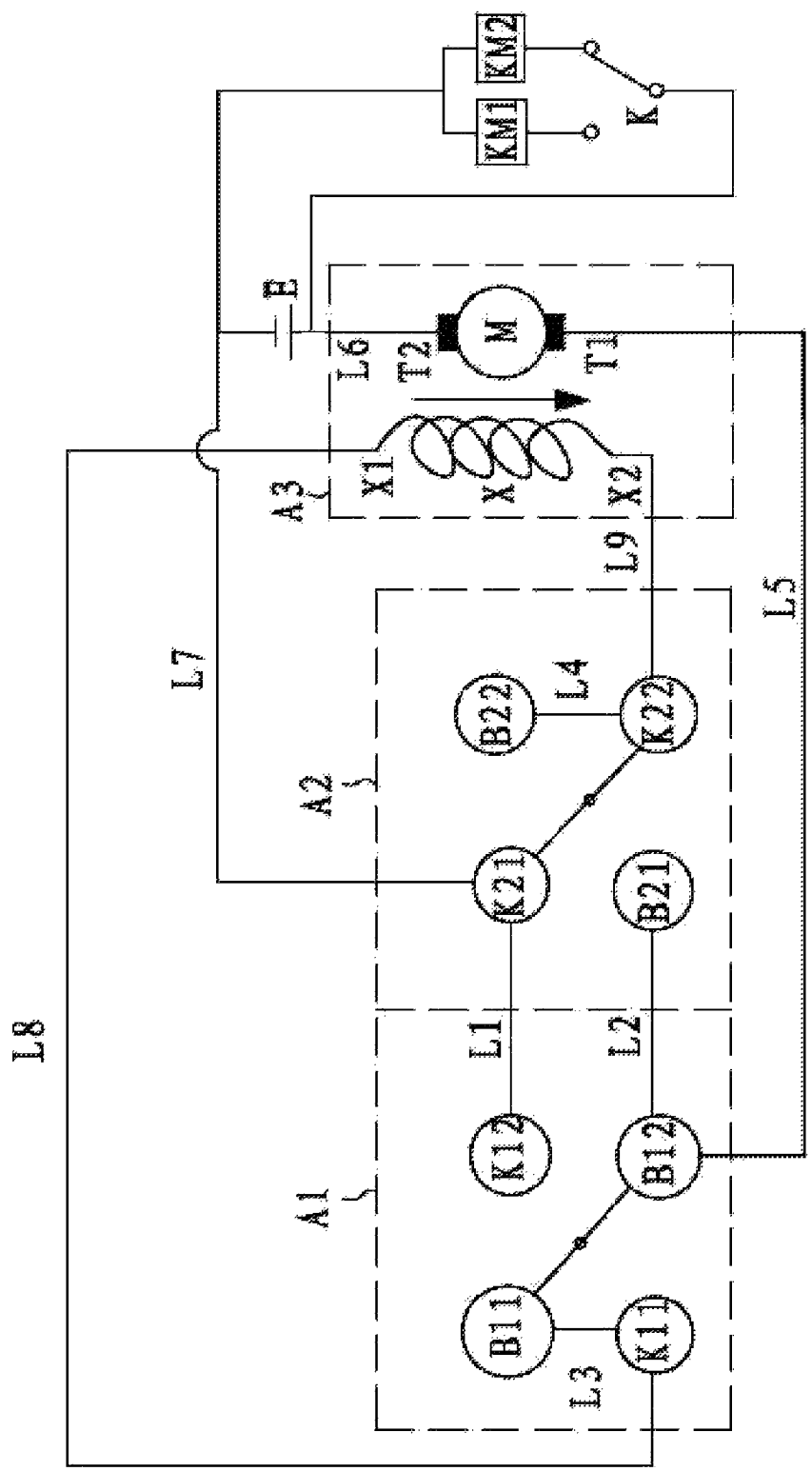
FIG. 7 is a principle diagram of the current direction controller according to one embodiment of the present invention, in which the current direction controller is in an energized state and the motor rotates in a second direction opposite to the first direction.

One normally open contact K11 of the first contactor A1 is connected with one normally closed contact B11 thereof and the first end X1 of the exciting coil X via a conducting wire L3 and a conducting wire L8 respectively. One normally open contact K22 of the second contactor A2 is connected with one normally closed contact B22 thereof and the second end X2 of the exciting coil X via a conducting wire L4 and a conducting wire L9 respectively. The other normally closed contact K12 of the first contactor A1 is connected with the other normally open contact K21 of the second contactor A2 via a conducting wire L1. The other normally open contact K21 of the second contactor A2 is also connected with one end of each of the contactor coils KM1, KM2 of the first and second contactors A1, A2 respectively via a conducting wire L7, and connected with the second carbon brush T2 via a power supply E. The other end of each of the contactor coils KM1, KM2 of the first and second contactors A1, A2 is configured to connect with an end of an external control switch K. Moreover, the one end of each of the contactor coils KM1, KM2 of the first and second contactors A1, A2 (and the other normally open contact K21 of the second contactor A2) is also connected with the negative pole of the power supply E. The other end of the external control switch K is connected with the positive electrode of the power supply E. Therefore, by controlling the external control switch K, the contactor coil KM1 of the first contactor A1 may be energized while the contactor coil KM2 of the second contactor A2 may be deenergized (as shown in FIG. 6). The contactor coil KM1 of the first contactor A1 may be deenergized while the contactor coil KM2 of the second contactor A2 may be energized (as shown in FIG. 7). In addition, the contactor coil KM1 of the first contactor A1 and the contactor coil KM2 of the second contactor A2 may be deenergized simultaneously (as shown in FIG. 5).

The other normally closed contact B12 of the first contactor A1 is connected with the other normally closed contact B21 of the second contactor A2 via a conducting wire L2, and with the first carbon brush T1 via a conducting wire L5.

Figure 5:
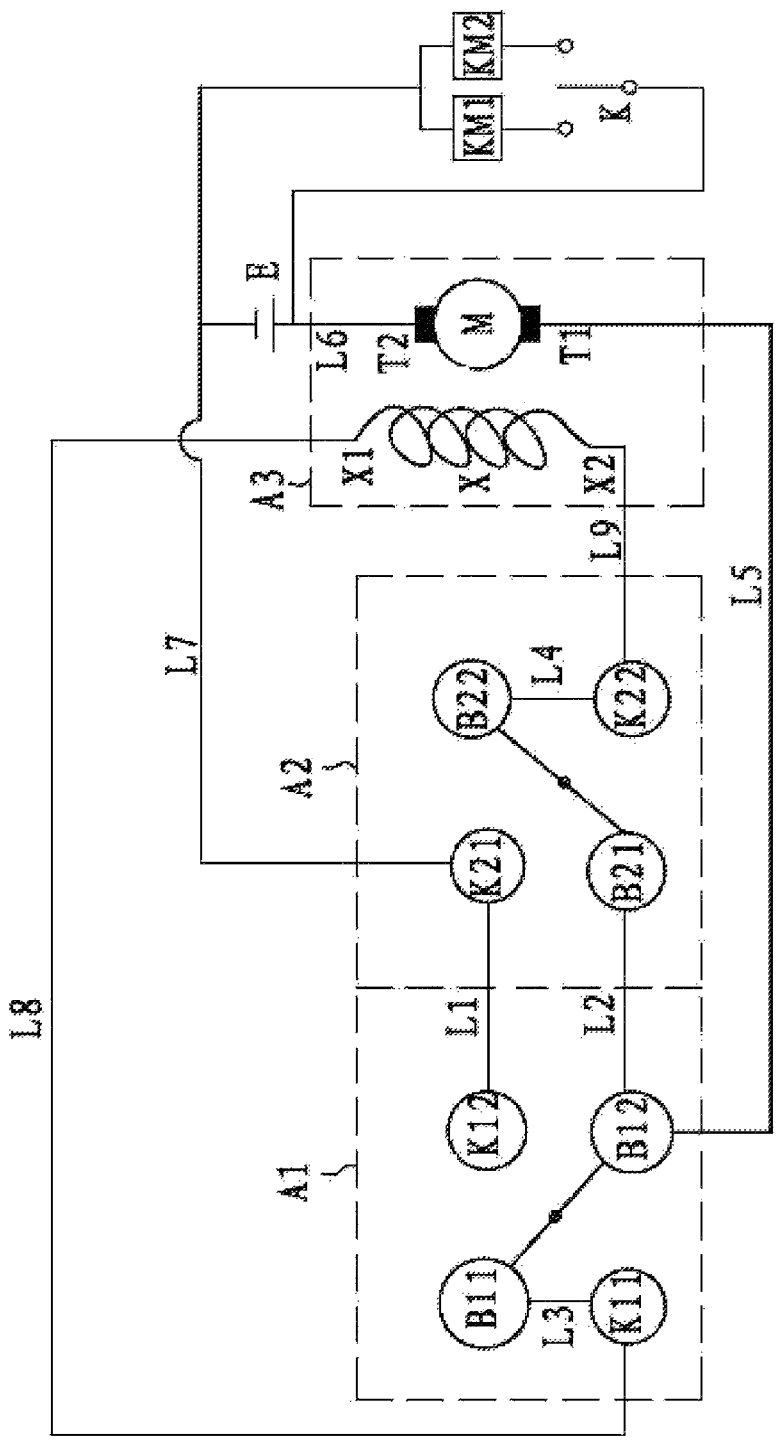
FIG. 5 is a principle diagram of the current direction controller according to one embodiment of the present invention, in which the current direction controller is in a deenergized state.

Therefore, as shown in FIG. 5, when the external control switch K is in its normally open position, both the contactor coils KM1 of the first contactor A1 and the contactor coil KM2 of the second contactor A2 are deenergized. The two normally open contacts K11, K12 of the first contactor A1 are disconnected from each other while the two normally closed contacts B11, B12 thereof are connected with each other. In addition, the two normally open contacts K21, K22 of the first contactor A2 are disconnected from each other while the two normally closed contacts B21, B22 thereof are connected with each other, so that the DC motor is stopped.

As shown in FIG. 6, when the external control switch K is in its first position (i.e. the left position in FIG. 6), the contactor coil KM1 of the first contactor A1 is energized while the contactor coil KM2 of the second contactor A2 is deenergized, and the two normally open contacts K11, K12 of the first contactor A1 are connected with each other while the two normally closed contacts B11, B12 thereof are disconnected from each other, so that the motor rotates in a first direction.

As shown in FIG. 7, when the external control switch K is in its second position (i.e. the right position in FIG. 7), the contactor coil KM2 of the second contactor A2 is energized while the contactor coil KM1 of the first contactor A1 is deenergized, and the two normally open contacts K21, K22 of the second contactor A2 are connected with each other while the two normally closed contacts B21, B22 thereof are disconnected from each other, so that the motor rotates in a second direction opposite to the first direction.

Figure 3:
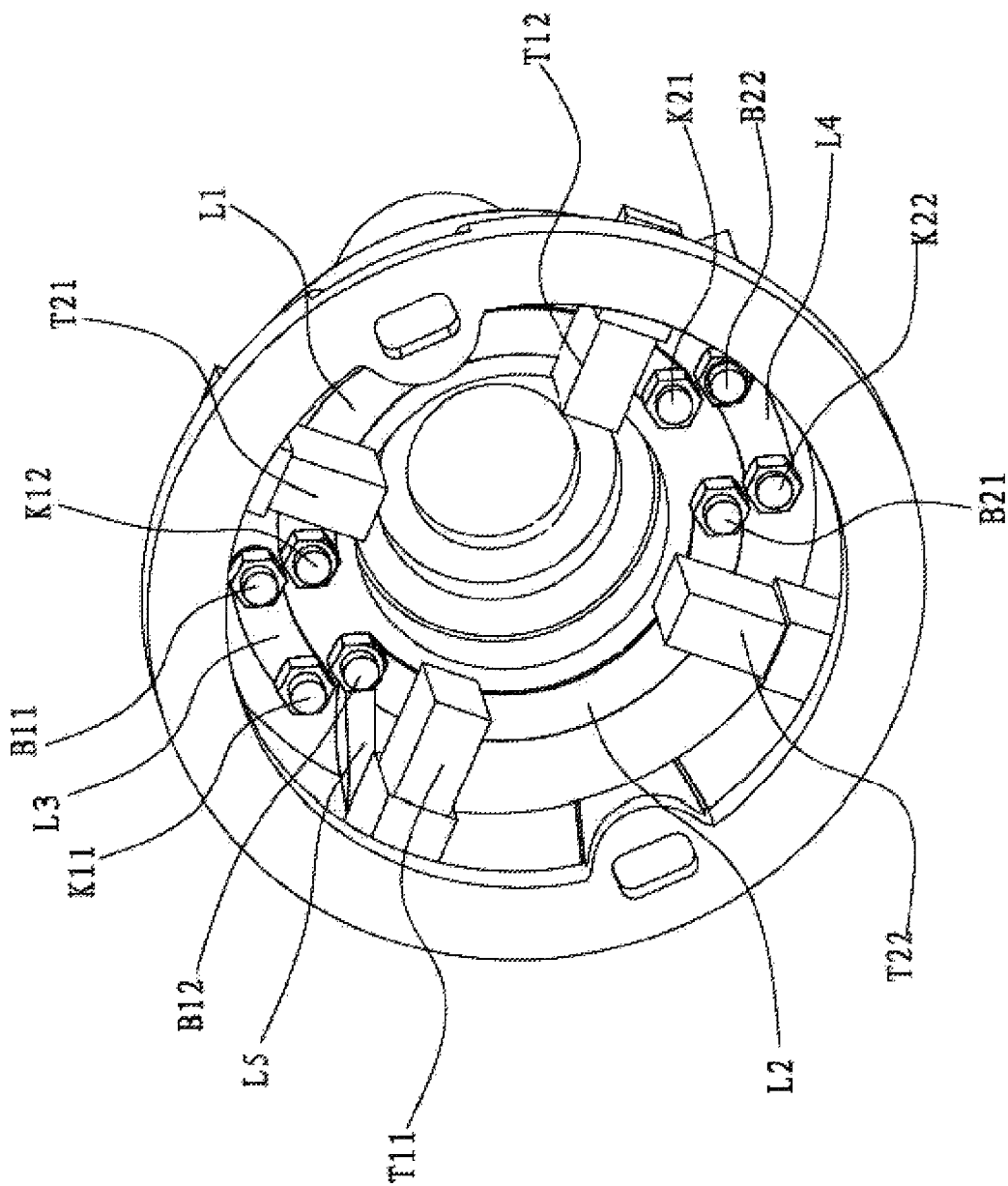
FIG. 3 is a perspective view of the brush holder of the DC motor according to one embodiment of the present invention.
Figure 4:
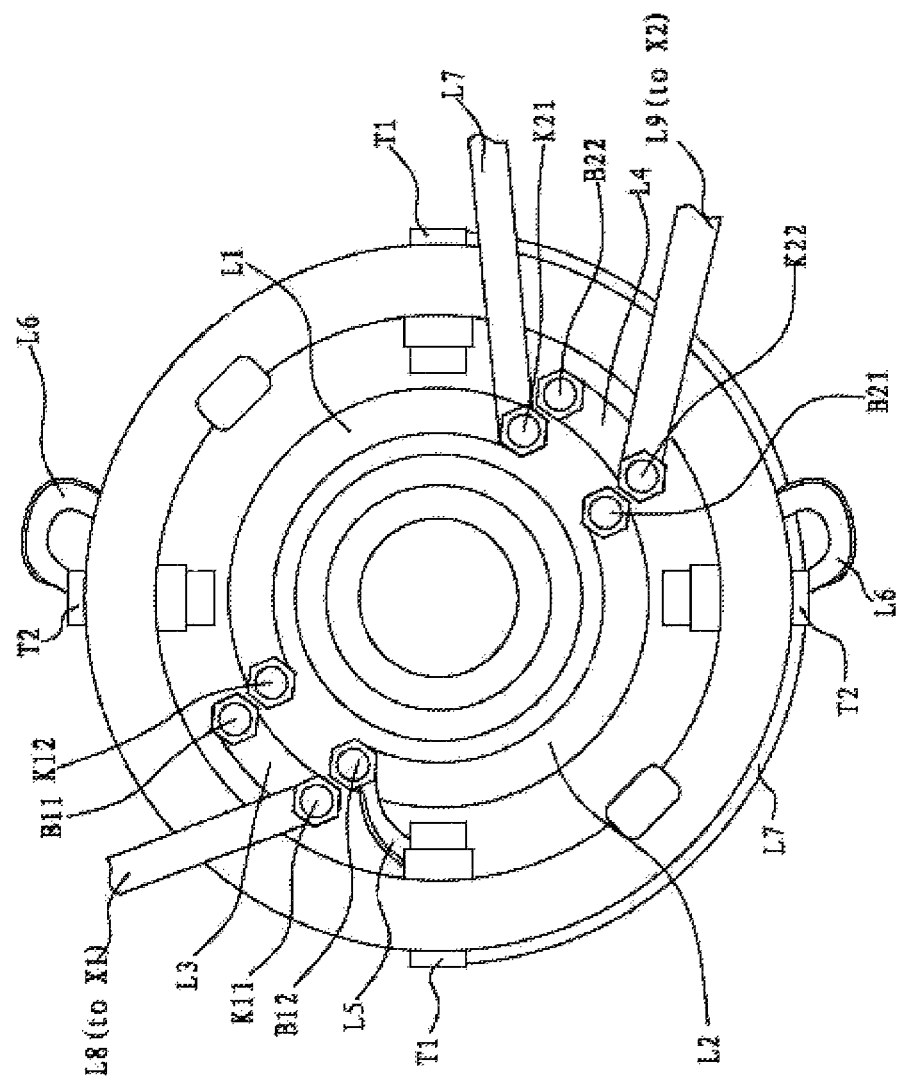
FIG. 4 is a plan view of the brush holder shown in FIG. 3.

As shown in FIGS. 3-5, in some examples of the present invention, the first carbon brush T1 comprises two sub-carbon brushes T11, T12 disposed on the brush holder 3 opposite to each other in a radial direction. Similarly, the second carbon brush T2 comprises two sub-carbon brushes T21, T22 disposed on the brush holder 3 opposite to each other in the radial direction. In one example, a first line connecting the two sub-carbon brushes T11, T12 of the first carbon brush T1 is substantially perpendicular to a second line connecting the two sub-carbon brushes T21, T22 of the second carbon brush T2. As shown in FIGS. 3 and 4, the two sub-carbon brushes T11, T12 are connected to each other in series via the conducting wire L7, and the two sub-carbon brushes T21, T22 are connected with the shell 11 respectively.

As shown in FIGS. 4 and 5-7, the other normally open contact K21 of the second contactor A2 is connected with a negative pole of the power supply E via the conducting wire L7, such that the other normally open contact K12 of the second contactor A1 is connected with the negative pole of the power supply E via the conducting wire L2, the normally open contact K22 of the second contactor A2, and the conducting wire L7, and the second carbon brush T2 is connected with the positive pole of the power supply E via the conducting wire L6.

Therefore, in the series-excited DC motor according to some embodiments of the present invention, the current direction controller 4 comprises two contactors, thus reducing the number of the contactors. Moreover, the contacts of the two contactors, the contactor coils and the wires are all disposed on the brush holder 3 and enclosed inside the cover 2, such that there are no wires and contactors outside the shell 11. As a result, the motor is compact in structure and small in volume, and the wires and connection points thereof are decreased in number, thus reducing the power consumption. Furthermore, because the current direction controller 4 is enclosed inside the cover 2, the current direction controller 4 and the wires and connection points thereof are not necessary to seal and insulate, so that the manufacture is much more simple, the cost is reduced, and the safety is improved.

The operation of the series-excited DC motor according to embodiments of the present invention will be described below in detail with reference to FIGS. 5-7.

Firstly, as shown in FIG. 5, when the external control switch K is in the disconnected position, both the contactor coil KM1 of the first contactor A1 and the contactor coil KM2 of the second contactor A2 are deenergized. The two normally open contacts K11, K12 of the first contactor A1 are disconnected from each other while the two normally closed contacts B11, B12 thereof are connected with each other. Meanwhile, the two normally open contacts K21, K22 of the second contactor A2 are disconnected from each other while the two normally closed contacts B21, B22 thereof are connected with each other. In this way, no current flows through the exciting coil X, so that the DC motor is stopped.

When the motor needs to rotate in the first direction, the external control switch K is switched to the first position (i.e. the left position as shown in FIG. 6), the contactor coil KM1 of the first contactor A1 is energized, and the two normally open contacts K11, K12 thereof are connected with each other while the two normally closed contacts B11, B12 thereof are disconnected from each other. Meanwhile, the contactor coil KM2 of the second contactor A2 is deenergized, and the two normally open contacts K21, K22 thereof are disconnected from each other while the two normally closed contacts B21, B22 thereof are connected with each other. In this way, the current flows from X2 to X1 in the exciting coil X, so that the motor rotates in a first direction (for example, the forward direction), as shown in FIG. 6.

When the motor needs to rotate in a second direction (for example, the reverse direction) opposite to the first direction, the external control switch K is switched to the second position (i.e. the right position in FIG. 7), the contactor coil KM1 of the first contactor A1 is deenergized, and the two normally open contacts K11, K12 thereof are disconnected from each other while the two normally closed contacts B11, B12 thereof are connected with each other. Meanwhile, the contactor coil KM2 of the second contactor A2 is energized, and the two normally open contacts K21, K22 thereof are connected with each other while the two normally closed contacts B21, B22 thereof are disconnected from each other. In this way, the current flows from X1 to X2 in the exciting coil X, so that the motor rotates in the second direction, as shown in FIG. 7.

Thus, with the DC motor according to embodiments of the present invention, the current direction controller 4 is mounted onto the brush holder 3 and enclosed by the cover 2, such that the motor is small in volume and compact in structure, the number of the wires and connection points of the current direction controller 4 is decreased, and the current direction controller 4 and the wires and connection points thereof are not necessary to seal and insulate form outside. Therefore the power consumption and the cost are reduced, and the manufacture efficiency and aesthetics are improved.

Reference throughout this specification to "one embodiment," "some embodiments," "an example," or "some examples," means that a particular feature, structure, material, or characteristic described in connection with the embodiment or example is included in at least one embodiment or example of the invention. Thus, the appearances of the phrases such as "in some embodiments," "in one embodiment", "an example," or "some examples," in various places throughout this specification are not necessarily referring to the same embodiment or example of the invention. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications all falling into the scope of the claims and their equivalents can be made in the embodiments without departing from spirit and principles of the invention.

What is claimed is:

1. An armature-and-exciter-windings series DC motor comprising:
    a stator including a shell, a main magnetic pole, and an exciting coil;
    a rotator disposed inside the stator;
    a brush holder disposed at an end of the shell;
    first and second carbon brushes disposed on the brush holder and contacted with the rotator respectively;
    a current direction controller disposed on the brush holder, connected with the first and second carbon brushes and first and second ends of the exciting coil respectively so as to control a direction of a current supplied to the exciting coil, and including first and second contractors, each of which has a pair of normally open contacts, a pair of normally closed contacts, and a contactor coil; and
    a cover disposed at the end of the shell so as to enclose the brush holder,
    wherein, when the contactor coil of the first contactor is energized and the contactor coil of the second contractor is deenergized, the pair of normally open contacts of the first contactor close, the pair of normally closed contacts thereof open, and the DC motor rotates in a first direction and, when the contactor coil of the second contactor is energized and the contactor coil of the first contactor is deenergized, the pair of normally open contacts of the second contactor close, the pair of normally closed contacts thereof open, and the DC motor rotates in a second direction opposite to the first direction;
    wherein one normally open contact of the first contactor is connected with one normally closed contact thereof and the first end of the exciting coil respectively and one normally open contact of the second contactor is connected with one normally closed contact thereof and the second end of the exciting coil respectively;
    wherein the other normally closed, contact of the first contactor is connected with the first carbon brush and the other normally closed contact of the second contactor respectively and the other normally open contact of the second contactor is connected with the second carbon brush, the other normally open contact of the first contactor, and an end of the contactor coil of each of the first and second contactors respectively;
    wherein each of the first and second carbon brushes comprises two sub-carbon brushes;
    wherein the two sub-carbon brushes of the first carbon brush are disposed opposite to each other in a radial direction on the brush holder;
    wherein the two sub-carbon brushes of the second carbon brush are disposed opposite to each other in the radial direction on the brush holder;
    wherein the two sub-carbon brushes of the first carbon brush are connected to each other in series and the two sub-carbon brushes of the second carbon brush are connected with the shell respectively; and
    wherein a first line connecting the two sub-carbon brushes of the first carbon brush is substantially perpendicular to a second line connecting the two sub-carbon brushes of the second carbon brush.

2. An armature-and-exciter-windings series DC motor comprising:
    a stator including a shell, a main magnetic pole, and an exciting coil;
    a rotator disposed inside the stator;
    a brush holder disposed at an end of the shell;
    first and second carbon brushes disposed on the brush holder and contacted with the rotator respectively;
    a current direction controller disposed cat the brush holder, connected with the first and second carbon brushes and first and second ends of the exciting coil respectively so as to control a direction of a current supplied to the exciting coil, and including first and second contactors, each of which has a pair of normally open contacts, a pair of normally closed contacts, and a contactor coil; and
    a cover disposed at the end of the shell so as to enclose the brush holder, wherein, when the contactor coil of the first contactor is energized and the contactor coil of the second contactor is deenergized, the pair of normally open contacts of the first contactor close, the pair of normally closed contacts thereof open, and the DC motor rotates in a first direction and, when the contactor coil of the second contactor is energized and the contactor coil of the first contactor is deenergized, the pair of normally open contacts of the second contactor close, the pair of normally closed contacts thereof open, and the DC motor rotates in a second direction opposite to the first direction;

wherein one normally open contact of the first contactor is connected with one normally closed contact thereof and the first end of the exciting cod respectively and one normally open contact of the second contactor is connected with one normally closed contact thereof and the second end of the exciting coil respectively;

wherein the other normally closed contact of the first contact is connected with the first carbon brush and be other normally closed contact of the second contactor respectively and the other normally open contact of the second contactor is connected with the second carbon brush, the other normally open contact of the first contactor, and an end of the contactor coil of each of the first and second contactors respectively;

wherein each if the first and second carbon brushes comprises two sub-carbon brushes;

wherein the two sub-carbon brushes of the first carbon brush are disposed opposite to each other in a radial direction on the brush holder; and wherein the two sub-carbon brushes of the second carbon brush are disposed opposite to each other in the radial direction on the brush holder; and wherein each of the other normally open contacts of the first and second contactors is adapted to connect with a negative pole of a power supply and the second carbon brush adapted connect with a positive pole of the power supply.

* * * * *

UNITED STATES PATENT AND TRADEMARK OFFICE
CERTIFICATE OF CORRECTION

| | | |
|---|---|---|
| PATENT NO. | : 8,519,647 B2 | Page 1 of 1 |
| APPLICATION NO. | : 12/831707 | |
| DATED | : August 27, 2013 | |
| INVENTOR(S) | : Yang et al. | |

It is certified that error appears in the above-identified patent and that said Letters Patent is hereby corrected as shown below:

In the Claims

Column 6, line 5 delete "contractors" and insert therefor --contactors--.

Column 6, line 11 delete "contractor" and insert therefor --contactor--.

Column 6, line 27 delete "," between "closed" and "contact".

Column 6, line 59 delete "cat" and insert therefor --on--.

Column 7, line 14 delete "cod" and insert therefor --coil--.

Column 7, line 18 delete "contact" and insert therefor --contactor--.

Column 7, line 19 delete "be" and insert therefor --the--.

Column 8, line 6 delete "if" and insert therefor --of--.

Column 8, line 10 delete "and" after "holder;".

Column 8, line 17 insert --is-- between "brush" and "adapted".

Column 8, line 17 insert --to-- between "adapted" and "connect".

Signed and Sealed this
Twenty-fourth Day of December, 2013

Margaret A. Focarino
*Commissioner for Patents of the United States Patent and Trademark Office*